March 10, 1964     R. CLAAS     3,124,138
THRESHING MACHINE HAVING A SPECIFIC CYLINDER AND CONCAVE
Filed Oct. 25, 1960     2 Sheets-Sheet 1
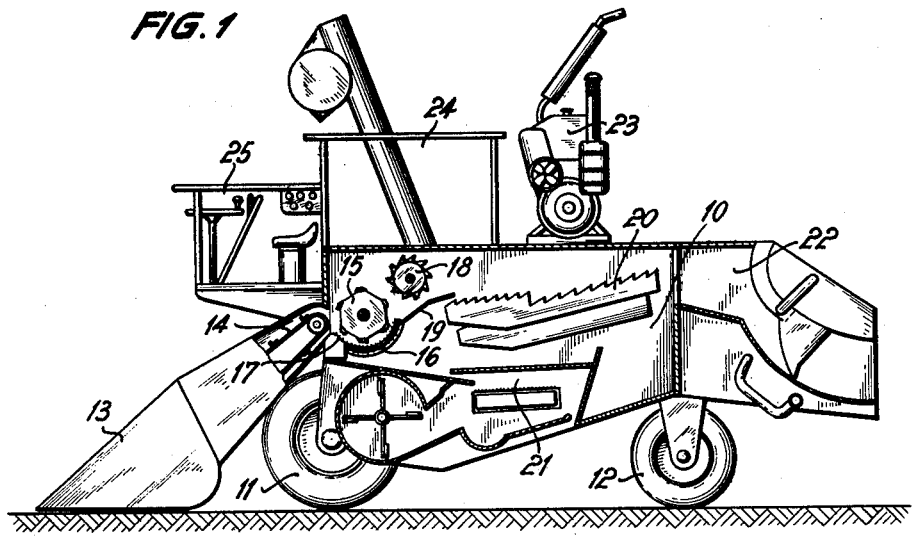
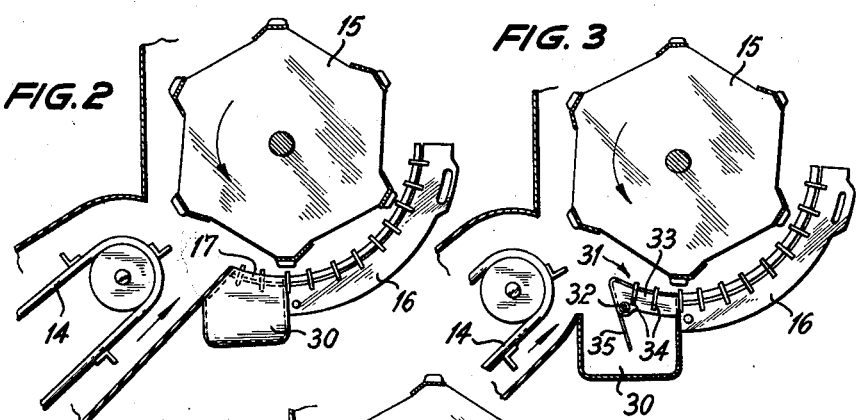
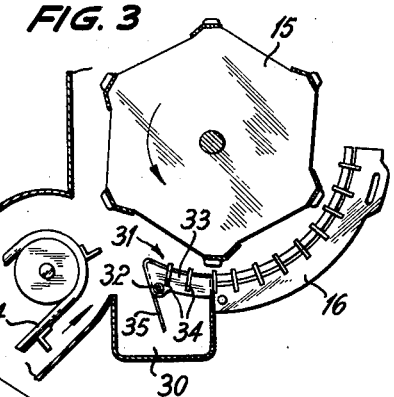
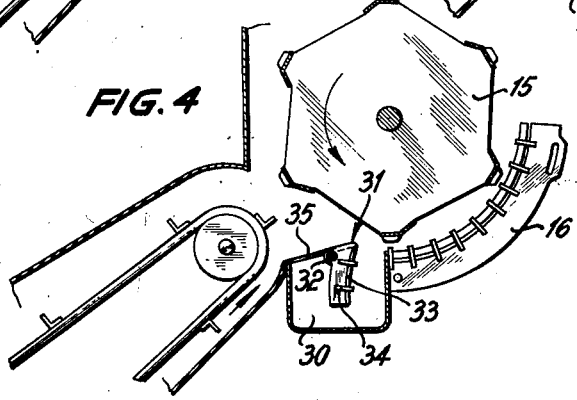
INVENTOR
Reinhold Claas
BY
Michael S. Striker
Attorney March 10, 1964 R. CLAAS 3,124,138
THRESHING MACHINE HAVING A SPECIFIC CYLINDER AND CONCAVE
Filed Oct. 25, 1960 2 Sheets-Sheet 2
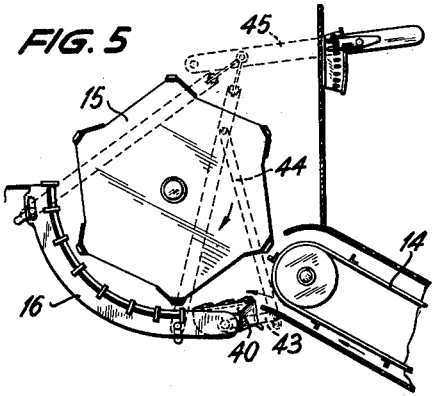
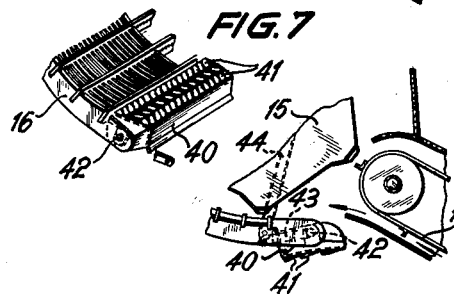
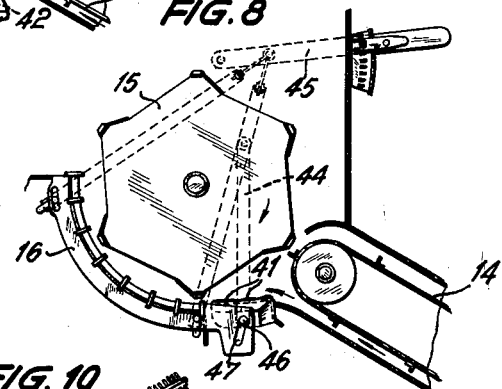
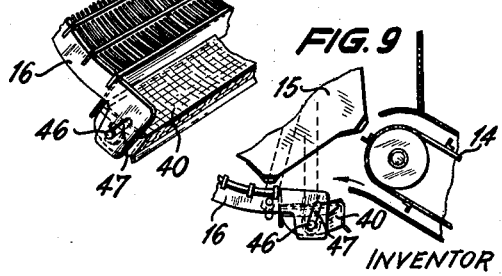
INVENTOR
Reinhold Claas
BY
Michael S. Striker
Attorney United States Patent Office 3,124,138
Patented Mar. 10, 1964

3,124,138
THRESHING MACHINE HAVING A SPECIFIC CYLINDER AND CONCAVE
Reinhold Claas, 64 August Claas Strasse, Harsewinkel, Westphalia, Germany
Filed Oct. 25, 1960, Ser. No. 64,950
Claims priority, application Germany Oct. 29, 1959
2 Claims. (Cl. 130—27)

This invention relates to a threshing machine, more specifically to a threshing mechanism for combine harvesters.

It is a well known fact that the performance of threshing mechanisms depends upon careful adjustment thereof to suit the nature of the crop to be threshed. To this end it is customary to drive the threshing drum at different rotary speeds and to adjust the threshing concave to the needs of the harvested crop. It is also known to interpose additional bars between the normal bars on the entry side of the threshing concave in order to achieve a satisfactory separation for instance of the awns from barley. Moreover, the openings between the bars at the entry side of the concave are occasionally closed, so that the pockets thus formed can fill up and provide a supplementary beating effect. However, expedients of this kind considerably constrict the flow of the crop through the thresher. More grain which has failed to pass between the bars of the concave therefore reaches the shaker. Losses are thus increased. The general use of concaves which are exceptionally long in the direction in which the crop travels does not commend itself because the excess power needed for driving the thresher is wasted if, as such, the crop demands the use of a concave of normal length.

The object envisaged by the present invention is to overcome the aforementioned drawbacks in that the advantages that can be gained by the above-mentioned expedient are fully retained without at the same time causing waste of power and unnecessary loss through the shakers.

This object is achieved by the provision of a threshing machine, particularly threshing mechanism for combine harvesters, which comprises a threshing drum, a concave cooperating with said drum, and an extension for said concave arranged at the entry side threof and adapted to be optionally placed into operative position for enlarging the effective area of said concave or to be removed from said operative position.

This proposal permits the number of beater bars or the number of grain loosening projections comprised in the concave—this number decisively determines the threshing effect—to be adjusted to suit any conditions without incurring the penalties involved in too closely or not at all spacing adjacent bars or projections or undesirably raising power consumption. According to the nature of the crop which is to be threshed, the proposed extension at the entry side of the concave may be introduced or inactivated as may be desired. This result can be achieved in various ways. For instance, the concave extension may be simply detachable. For setting the machine to suit the crop which is to be handled a certain amount of work is naturally involved in fitting an extension of this kind, although little time may actually be lost in performing it. In most cases it may therefore be considered expedient, according to another feature of the invention, to mount the proposed extension permanently but adjustably in the machine. The size of the effective concave area may then be varied by manipulating simple setting controls.

Extensions which can thus be optionally moved into operative and inoperative positions may be contrived in diverse ways. For instance, an optionally activatable concave extension at the entry side of the concave may be associated with a stone catcher trough provided in the threshing mechanism and contrived in a suitable way for the extension to be lowered into the same when displaced into inactive position. Alternatively, the optionally activatable extension may be suitably designed to form a stone catching trough or part of a stone catching trough when it is retracted into an inoperative position. This will generally provide a particularly compact and space-saving design. However, in such an arrangement the stone catcher trough will naturally be available only when threshing proceeds and the extension is not used to enlarge the surface area of the concave.

The extension may be adjustably fitted to the machine in various ways. In one possible form of construction the extension may be tiltably mounted about its longitudinal axis and thus adapted to be rotated into an operative or into an inoperative position and, in the latter position, the extension may be contrived to form a stone catcher trough or part of such a trough. Alternatively, the extension may be slidably displaceable in translatory motion, and any suitable sliding guide means may be provided to this end. For instance the extension may be slidably mounted in special guideways in the form of slots in a supporting part of the frame of the machine. In another feasible form of construction the extension may be mounted on deflectable arms or the like and perform a combined sliding and tilting motion.

The optionally activatable concave extension may itself be of different forms of construction. Its effective surface may be formed in the same manner as the concave proper in the form of a grating or, in given circumstances, it may be preferred to provide an extension without openings but formed with a surface having projecting embossments which have a beating effect for detaching the grain from the ears.

The setting means for activating and inactivating a concave extension as proposed by the present invention may likewise be contrived in various ways. The provision of separate manually operable control means is a simple solution. However, it may sometimes be considered convenient to combine the setting means of the concave with the control means of the concave extension.

Several preferred embodiments of the invention will now be described by way of example and with reference to the accompanying drawings, in which:

FIG. 1 is a side elevational view, partly in section, of a threshing machine;

FIG. 2 is a side elevational view, on a larger scale, of a mechanism contrived in the manner proposed by the present invention;

FIG. 3 is a side elevational view of a modification of the embodiment shown in FIG. 2;

FIG. 4 is a similar representation of the modification according to FIG. 3, showing the concave extension in inactivated position;

FIG. 5 is a side elevational view similar to that shown in FIGS. 2 to 4 of a further embodiment of a concave extension in operative position;

FIG. 6 is a similar representation of the embodiment according to FIG. 5, showing the extension in retracted inoperative position;

FIG. 7 is a perspective view of part of a concave with an extension according to FIG. 5 in operative position at the entry side of the concave;

FIG. 8 is a side elevational view, similar to that in FIG. 5, of yet another embodiment of a concave extension according to the invention at the entry side of the concave in operative position;

FIG. 9 is a similar representation of the extension illustrated in FIG. 8, but in retracted inactivated position, and FIG. 10 is a representation similar to that in FIG. 7 of a concave with an extension according to FIG. 9 at the entry side of the concave in inoperative position.

With reference now to FIG. 1 which illustrates a self-propelled combine harvesting machine, a frame 10 is mounted on pairs of wheels 11 and 12, the forward end of said frame 10 carrying a cutter assembly 13 which delivers the crop on endless conveyor means 14 to a thresher likewise mounted within said frame. The latter substantially comprises a threshing drum 15 and a concave 16 cooperating therewith. If required, an extension 17 can be attached to the entry side of said concave. Behind the drum 15 is a beater 18 which in conventional manner revolves in the same direction as the threshing drum above a screen 19 which bridges the distance between the concave 16 and a straw shaker 20. The drum 15 and the beater 18 are rotatably mounted on parallel axles preferably between opposite side walls of the frame 10. Most of the grain rubbed out of the ears drops through the concave 16 and the screen 19 on to a dressing shoe 21 which may be constructed in any conventional manner known to the art. The straw passes out on to the shaker 20 where the remaining grain is shaken out. After leaving the shaker 20 the straw may be delivered to a baling press 22. The frame 10 of the combine harvester which is driven by an internal combustion engine 23 is surmounted by a bagging stand 24 to which the grain is delivered in conventional manner. The machine frame 10 is also equipped with a cab 25 for the driver.

In an embodiment of the invention which is illustrated on a larger scale in FIG. 2, the extension 17 of the concave is detachably fitted above a stone catcher trough 30. The extension can therefore be fitted whenever required, for instance for the threshing of barley, whereas it can be removed from the machine when crops of other kinds are to be threshed, in order to reduce to a minimum the power required for driving the thresher.

The arrangement shown in FIGS. 3 and 4 substantially corresponds with that illustrated in FIG. 2 inasmuch as a stone catcher trough 30 is provided at the entry side of the concave 16 below a concave extension 31. However, in the form of construction in FIGS. 3 and 4 the said concave extension 31 is tiltably mounted on coaxial pins 32 which project from each side and are held in the machine frame or in the side walls of the stone catcher trough 30. The concave extension 31 is of roughly angular section forming two flanks 33 and 35, one flank 33 having a grating with bars 34 like the concave, whereas the other flank 35 may take the form of a flat plate. As will be readily understood by reference to FIGS. 3 and 4 the stone catcher trough 30 in this form of construction is never inactivated, irrespective of whether the extension is titled into operative position according to FIG. 3 or into inoperative position according to FIG. 4.

In the embodiment shown in FIGS. 5 to 7, an extension 40 is likewise tiltably mounted at the leading end of the concave in a manner similar to that described by reference to FIGS. 3 and 4, but the provision of a stone catcher trough is dispensed with. The extension 40 itself in this form of construction is substantially box-shaped with an unperforated surface provided with projecting embossments 41 which have a similar action on the crop as the bars. In FIGS. 5 to 7 the extension is shown in operative position in which it forms a prolongation of the concave 16, for instance, for threshing barley and like crops. In FIG. 6 the extension 40 is shown tilted into inverted position in which it does not participate in the threshing action. However, in this position it forms a stone catcher trough. In this form of construction, as in the embodiments shown in FIGS. 3 and 4 tipping of the concave extension 40 about pivot pins 42 may be effected by manually operable levers. However, it may be preferred as more convenient to provide a rod linkage 43, 44 for coupling the concave extension 40 with means 45 provided for setting the concave. This simplifies coordinated control. However, the arrangement may be so contrived that, whenever desired, the concave extension 40 can be operated independently of any adjustment of the concave 16 itself.

The further embodiment shown in FIGS. 8 to 10 resembles the form of construction according to FIGS. 5 to 7 inasmuch as a concave extension 40 is likewise provided with an unperforated surface formed with projecting embossments 41. However, in this case the concave extension 40 is not tiltable about its longitudinal axis but shiftable in substantially translatory motion by being mounted on pins 46 which slidably engage appropriate guide means, such as slots 47, in members affixed to the frame. In this form of construction the concave extension 40 may operate as such when in the position shown in FIG. 8, or it may be retracted as illustrated in FIGS. 9 and 10 when it forms at least part of a stone catcher trough. Control of the concave extension 40 may likewise be by the rod linkage 44 coupled with the means 45 for setting the concave 16 if this should be considered desirable for reasons of more convenient control. Nevertheless, provision is likewise made for independently adjusting the concave and the extension.

The embodiments that have been described are understood to be merely illustrative of the invention. They are not intended to limit its scope. Various alternative forms of construction may be devised. The optionally operatable extension of the concave illustrated in FIGS. 5 to 7 and 8 to 10 might likewise be in the form of a grating, whereas in arrangements of the kind shown in FIGS. 2, 3 and 4 the extension might have any unperforated surface with projecting embossments 41 or the like. If desired, and as may be considered convenient, the concave extension may be of divided construction or consist of integral sheet metal parts or of a single piece casting. Moreover, a plurality of concave extensions of different construction for optional use may be provided for use in a threshing machine to permit the machine to be more carefully adjusted to any particular set of working conditions.

I claim:

1. A threshing mechanism, particularly for combine harvester comprising, in combination, a threshing drum; feeding means for feeding material to be threshed toward said threshing drum and having a delivery and directed toward said drum; a concave having an active surface of a given length directed toward and cooperating with said drum and having a receiving end spaced from said delivery end of said feeding means; extension means located between said delivery end of said feeding means and said receiving end of said concave, said extension means having a pair of surfaces inclined with respect to each other; and means mounting said extension means tiltable between an active position in which one of said surfaces form a continuation of said active surface of said concave for increasing the length of said active surface and a lead-in position in which said one surface is spaced from said receiving end of said concave to form a stone-catching gap therewith while the other surface forms a continuation of said delivery end of said feeding means for facilitating feeding of material to be threshed from said delivery end to said receiving end of said concave.

2. A threshing mechanism, particularly for combine harvester comprising, in combination, a threshing drum; feeding means for feeding material to be threshed toward said threshing drum and having a delivery end directed toward said drum; a concave having an active surface of a given length directed toward and cooperating with said drum and having a receiving end spaced from said delivery end of said feeding means; extension means located between said delivery end of said feeding means and said receiving end of said concave, said extension means having a pair of surfaces inclined with respect to each other; and one of which is formed with a plurality of projections; and means mounting said extension means tiltable between an active position in which said one of said surfaces forms a continuation of said active surface of said concave for increasing the length of said active surface and a lead-in position in which said one surface is spaced from said receiving end of said concave to form a stone-catching gap therewith while the other surface forms a continuation of said delivery end of said feeding means for facilitating feeding of material to be threshed from said delivery end to said receiving end of said concave.

References Cited in the file of this patent

UNITED STATES PATENTS

| | | |
|---|---|---|
| 902,710 | Carlson | Nov. 3, 1908 |
| 1,226,601 | Schwartz | May 15, 1917 |
| 2,959,175 | Oberholtz et al. | Nov. 8, 1960 |

FOREIGN PATENTS

| | | |
|---|---|---|
| 467,475 | Canada | Aug. 22, 1950 |
| 792,792 | Great Britain | Apr. 2, 1958 |